United States Patent [19]

Suzuki et al.

[11] Patent Number: 6,103,293
[45] Date of Patent: Aug. 15, 2000

[54] VISCOSITY FORMED CHOCOLATE AND ITS MANUFACTURE

[75] Inventors: Takatoshi Suzuki; Akira Kurooka, both of Izumisano, Japan

[73] Assignee: Fuji Oil Co., Ltd., Izumisano, Japan

[21] Appl. No.: 09/103,804

[22] Filed: Jun. 24, 1998

[30] Foreign Application Priority Data

Jun. 25, 1997 [JP] Japan ................................ 9-168282

[51] Int. Cl.⁷ ...................................................... A23G 1/00
[52] U.S. Cl. ........................................... 426/631; 426/661
[58] Field of Search ..................................... 426/631, 660

[56] References Cited

U.S. PATENT DOCUMENTS

| | | |
|---|---|---|
| 4,081,559 | 3/1978 | Jeffrey et al. . |
| 4,456,626 | 6/1984 | Nelson .................................... 426/606 |
| 4,456,627 | 6/1984 | Van Heteren ........................... 426/607 |
| 4,464,411 | 8/1984 | Herzing .................................... 426/613 |
| 4,524,086 | 6/1985 | Player et al. . |
| 4,680,184 | 7/1987 | Seiden ....................................... 426/94 |
| 4,847,105 | 7/1989 | Yokobori ................................. 426/607 |
| 4,980,192 | 12/1990 | Finkel . |
| 5,326,581 | 7/1994 | Higashioka et al. . |

OTHER PUBLICATIONS

D.P.J. Moran: "The influence of some surfactants on the viscosity of confectionery fat/sugar mixtures" Revue Internationale Du Chocolat, vol. 24, No. 12, Dec. 1969, pp. 478–482, XP002102979.

Minifie 1989 Chocolate, Cocoa and Confectionary: Science and Technology 3rd Edition AVI Publishing New York p. 116–122, 164–179.

Weyland, Mark, "Functional Effects of Emulsifiers in Chocolate," The Manufacturing Confectioner, May 1994, pp. 111–117.

Player, Kenneth, "Emulsifier Application for Confectionery Products," The Manufacturing Confectioner, Oct. 1986, pp. 61–65.

Musser, Jay C., "The Use of Monoglycerides In Chocolate and Confectionery Coatings", The Manufacturing Confectioner, Jun. 1980, pp. 69–80.

*Primary Examiner*—Carolyn Paden
*Attorney, Agent, or Firm*—Shinjyu An Intellectual Property Firm

[57] ABSTRACT

A chocolate composition manufacturing method by which a chocolate is produced that has improved oral dissolvability, and at the same time that is workable within the particular constraints of equipment for producing formed chocolate confections or confectionary products including molded or otherwise formed chocolate. These properties are achieved by composing the chocolate to be 35–60% by weight fatty oil and including in the chocolate composition an emulsifier of below 10 iodine value, selected from glycerol esters of fatty acids and poly-glycerol fatty acid esters, i.e., those in which constituting fatty acids are saturated, such that after roll-milling and conching the chocolate composition, its Casson plastic viscosity at 45° C. is 40 to 600 poises.

9 Claims, No Drawings

VISCOSITY FORMED CHOCOLATE AND ITS MANUFACTURE

BACKGROUND OF THE INVENTION

1. Technical Field

The present invention relates to fatty-oil containing formed confections; in particular it relates to formed chocolate manufacturing methods and to the confections produced by such methods.

Formed chocolate includes chocolate liquor processed for formation into chips, sticks or other arbitrary shapes. What is termed chocolate in the present invention, however, is not limited to the regulatory or other legal stipulations of a particular country (in Japan for example, the Fair Labeling Regulations Concerning Chocolate), but broadly refers to chocolate products of all kinds, such as ordinary plain chocolate in which so-called cocoa substitute fats are employed, milk chocolate, white chocolate, or strawberry-like, etc. colored and flavored chocolates.

2. Description of Related Art

Conventionally, bar chocolate and chocolate formed into drops are representative of chocolate that is eaten as is, but chocolate preparations formed otherwise into sticks or various patterns in order to be easier to eat and to have a neater outward appearance have recently been brought out on the market.

Methods of shaping such formed chocolates include deposit-forming with an extruder, wherein chocolate from a forming machine is deposited directly onto a flat belt or the like and cool-hardened, and molding, wherein chocolate is cast into a previously formed mold and cool-hardened.

In the former case, i.e., in deposit-forming chocolates with an extruder, the viscosity must be adjusted so that the deposited chocolate does not spread on the belt. To achieve desired shapes in deposit-forming, accordingly, it has been necessary to increase the solid-portion content of the chocolate, consequently decreasing the fatty oil content, typically to within 28–33% by weight of the total weight of the chocolate preparation. Formed chocolate products from chocolate preparations having solid and fatty oil content in these proportions as such, however, are unsatisfactory in respect of how the chocolate melts in the mouth (which has been termed "mouth-feel," or "mouth-melt" in the art and will be referred to as "oral dissolvability" hereinafter).

Attempts to improve the oral dissolvability of a preparation for producing formed chocolate by mixing a liquid oil such as soybean oil or rapeseed oil into the fatty oil portion of the chocolate preparation in order to lower its melting point are not effective since this does not alter the large proportion of the content of solids relative to the bulk of the preparation. The consequent approach to improving oral dissolvability is to decrease the solid-portion content, which entails increasing the fatty oil content.

Nevertheless, while increasing the fatty oil content certainly improves oral dissolvability, it lowers the viscosity per se of the chocolate preparation. There is a limited range of viscosity in which the forming or molding functions in connection with a particular manufacturing installation are possible, and in manufacturing, viscosity thus reduced can amount to deterioration in the formability of the chocolate preparation, impeding the forming processes. There consequently has been a limit to the quantity by which the fatty oil can be increased in order to yield formable chocolate of satisfactory oral dissolvability. At present palatable formed chocolate of sufficiently satisfactory oral dissolvability has yet to be seen on the market.

SUMMARY OF THE INVENTION

It is an object of the present invention to achieve manufacture of formed chocolate having improved oral dissolvability.

It is a particular object of the present invention to produce formed chocolate having highly satisfactory oral dissolvability, through a method of manufacturing chocolate for forming in confectionary production that takes into account the limits by which the fatty oil content of the chocolate can be increased due to the nature of the forming processes, and by reasons of the forming equipment in particular formed-chocolate manufacturing installations.

As the result of persistent research, the present inventors attained knowledge by which they were able to achieve the foregoing objects. Namely, the present invention is accomplished by increasing the fatty oil content of a chocolate compound for producing formed chocolates, and by adjusting the chocoLate's hardness at a predetermined temperature, i.e., the viscosity within a predetermined range, using as an emulsifier in the chocolate compound glycerol fatty acid esters in which constituting fatty acids are saturated acids.

The present invention in a particular aspect is a method of producing chocolate for forming in confectionary production, characteristically distinct from conventional methods in that a fatty oil is employed such that the fatty oil part within the chocolate is made 35–60% by weight; an emulsifier of below 10 iodine value is used, selected from glycerol fatty acid esters and poly-glycerol fatty acid esters; and the chocolate viscosity at 45° C. after a roll-refining and conching treatments is adjusted to 200 poises or greater (wherein measured in a model BM viscometer, mfr. by Tokyo Keiki Inc., 12 rpm, no. 4 rotor) and 2000 poises or less (wherein measured in the same model BH viscometer 10 rpm, no. 7 rotor when the viscosity exceeds 500 poises). The afore-noted range of viscosity is equivalent to a Casson plastic viscosity of 40 to 600 poises.

For chocolate compounds in the present invention, it is necessary to use fatty oil at larger quantity than compared to conventional formed chocolate preparations, and it is suitable to use 35–60% by weight, more preferably 40–55% by weight fatty oil in proportion to the total weight of the chocolate.

An important requirement in the present invention is the use of glycerol fatty acid esters or polyglycerol fatty acid esters in which constituting fatty acids are saturated acids. Specifically, it is necessary to employ glycerol fatty acid esters or polyglycerol fatty acid esters of iodine value below 10, more preferably below 5. If glycerol esters of fatty acids or polyglycerol esters of fatty acids of greater than 10 iodine value, i.e., glycerides having a relatively higher proportion of unsaturated fatty acids, are used, it is consequently difficult to obtain elevated viscosity of the chocolate preparation. In contrast, the effects of the present invention are achievable regardless of the lower limit of the iodine value, which can even be 0, wherein the constituting fatty acids all are saturated acids.

As glycerol esters of fatty acids, glycerol mono-esters of fatty acid that contain a small quantity of di-ester, i.e., the so-called monoglycerides are preferable; especially preferable are monoglycerides of a high degree of purity, for example, distilled monoglycerides. Further, it is also possible in accordance with the present invention to use polyglycerol esters of fatty acids, i.e., glycerides having multiply-linked glycerol esters of fatty acids. As other emulsifiers, commonly used lecithin or polysorbate may be suitably used in combination with the above-mentioned emulsifiers.

In the present invention as above, raw materials for manufacturing a chocolate for forming in confectionary production include one or the other or both of cocoa or cocoa mass; sugar; powdered whole milk or powdered skim milk as desired; fatty oil; flavorings; and emulsifiers. These raw materials, following standard methods, are mixed, roll-mill and conche-treated, afterwards subjected to a tempering treatment as need be, and formed in a conventionally known manufacturing installation functional to produce chocolate confections. With respect to forming chocolate using conventionally known manufacturing installations, the Casson plastic viscosity of the chocolate preparation at 45° C. after the roll-milling and conching treatments must be 40 poises or more. Herein, the Casson plastic viscosity of the chocolate preferably may be 53 poises or more; more preferably still, 73 poises or more.

In accordance with the present invention, in order to obtain chocolate viscosity as above, by adding glycerol esters of fatty acid, or polyglycerol (esters of fatty acid, within the range 1–5% by weight to the total weight of the chocolate preparation, the chocolate can be thickened to a predetermined viscosity. The quantity used of the above-noted glycerol esters of fatty acid, or polyglycerol esters of fatty acid, however will vary, depending on the chocolate compound, in particular depending on the fatty oil content or the fatty oil used. Therefore, while an unconditional rule cannot be made, in general the Quantity of emulsifier as taught by the present invention may be within the above-noted range.

In the present invention, it is possible to use low-melting point fats and oils as the fatty oil constituent in the chocolate preparation. Formed chocolate manufactured using such low-melting point fatty oils can be used in chilled or frozen applications.

The foregoing and other objects, features, aspects and advantages of the present invention will become more apparent from the following detailed description. While practical aspects of the present invention will be concretely described below by the embodied examples, these are by way of illustration and do not restrict the scope of rights in the invention.

In the embodiments examples cited below, "parts" and "%" mean parts by weight and percent by weight, respectively.

DETAILED DESCRIPTION OF THE PREFERRED EMBODIMENTS

Embodiment 1

| MILK CHOCOLATE CHIP PREPARATION | | |
|---|---|---|
| Chocolate Compound (in parts) | | |
| cocoa mass | 20.9 | parts |
| powdered whole milk | 10.3 | " |
| sugar | 37.1 | " |
| soft palm kernel oil (melt. pt. 20° C.) | 22.3 | " |
| soybean oil | 9.4 | " |
| vanillin | 0.03 | " |
| sugar ester (HLB16) | 0.5 | " |
| glycerol ester of fatty acid (IV.2) | 2.5 | " |
| Total Fatty Oil Content (%) | 45.9 | % |

| MILK CHOCOLATE CHIP PREPARATION | | |
|---|---|---|
| Breakdown of Fatty Oil Ingredients (%) | | |
| cocoa butter | 25.1 | % |
| milk fat | 5.9 | " |
| soft palm oil | 48.5 | " |
| soybean oil | 20.5 | " |
| Viscosity at 45° C. | | 92 P (poises) |

Chocolate for forming in confectionary production was prepared using a raw material made from the above compounds, subjecting the preparation to roll-milling and conching treatments according to ordinary methods, whereupon the Casson plastic viscosity when measured at 45° C. was 92 poises.

Subsequently, chocolate chips of approximately 0.05 g single-lump weight with horn-shaped tips were obtained by dripping the chocolate preparation onto a steel belt by means of a depositor having a nozzle with a 5 mm diameter aperture.

COMPARATIVE EXAMPLE 1

A Chocolate for forming in confectionary production was prepared likewise as in Embodiment 1, except that no glycerol fatty acid esters was added. After a conching treatment the Casson plastic viscosity at 45° C. was 27 poises. The resulting chocolate preparation was too soft to be formed into chips.

Embodiment 2

| SWEET CHOCOLATE CHIP PREPARATION | | |
|---|---|---|
| Chocolate Compound (in parts) | | |
| cocoa mass | 22.0 | parts |
| cocoa | 3.9 | " |
| sugar | 34.8 | " |
| lactose | 5.0 | " |
| soft palm kernel oil (melt. pt. 20° C.) | 22.7 | " |
| soybean oil | 9.8 | " |
| vanillin | 0.05 | " |
| sugar ester (HLB16) | 0.5 | " |
| glycerol ester of fatty acid (IV.2) | 2.5 | " |
| Total Fatty Oil Content (%) | 47.0 | % |
| Breakdown of Fatty Oil Ingredients (%) | | |
| cocoa butter | 26.6 | % |
| soft palm oil | 48.2 | " |
| soybean oil | 20.9 | " |
| hardened oil | 4.3 | " |
| Viscosity at 45° C. | | 92 P (poises) |

Chocolate for forming in confectionary production was prepared using a raw material made from the above compounds, subjecting the preparation to roll-milling and conching treatments according to ordinary methods, whereupon the Casson plastic viscosity when measured at 45° C. was 92 poises.

Subsequently, chocolate chips of approximately 0.05 g single-lump weight with horn-shaped tips were obtained by dripping the chocolate preparation onto a steel belt by means of a depositor having a nozzle with a 5 mm diameter aperture.

COMPARATIVE EXAMPLE 2

A Chocolate for forming in confectionary production was prepared likewise as in Embodiment 2, except that no glycerol fatty acid esters was added. After a conching treatment the Casson plastic viscosity at 45° C. was 13 poises. The resulting chocolate preparation was too soft to be formed into chips.

Embodiments 3–6

| MILK CHOCOLATE CHIP PREPARATIONS | | | | |
|---|---|---|---|---|
| | Embod. 3 | Embod. 4 | Embod. 5 | Embod. 6 |
| Chocolate Compound (in parts) | | | | |
| cocoa mass | 21.4 | 21.0 | 18.0 | 16.2 |
| powdered whole milk | 7.9 | 7.4 | 6.7 | 6.0 |
| lactose | 7.5 | 7.0 | 6.4 | 6.4 |
| sugar | 36.3 | 33.9 | 30.7 | 27.5 |
| soft palm kernel oil (melt. pt. 20° C.) | 18.9 | 22.3 | 26.8 | 31.4 |
| soybean oil | 8.0 | 9.4 | 11.3 | 13.2 |
| vanillin | 0.03 | 0.03 | 0.03 | 0.03 |
| sugar ester (HLB16) | 0.5 | 0.5 | 0.5 | 0.5 |
| glycerol ester of fatty acid (IV.2) | 1.5 | 2.4 | 3.4 | 4.5 |
| Total Fatty Oil Content (%) | 40.7 | 44.6 | 49.7 | 55.1 |
| Breakdown of Fatty Oil Ingredients (%) | | | | |
| cocoa butter | 29.0 | 24.6 | 19.9 | 16.1 |
| milk fat | 5.0 | 4.3 | 3.4 | 2.9 |
| soft palm oil | 41.4 | 50.0 | 54.0 | 57.0 |
| soybean oil | 24.6 | 21.1 | 22.7 | 24.0 |
| Viscosity at 45° C. | 61 P | 69 P | 56 P | 54 P |

Chocolate preparations for forming in confectionary production were made in each of Embodiments 3–6 employing in each case a raw material made from the compounds in the table above in the proportions as listed for each embodiment. The raw material chocolate in each case was then subjected to roll-milling and conching treatments according to ordinary methods, whereupon the Casson plastic viscosities when measured at 45° C. of the chocolate preparations done according to each of Embodiments 3–6 were 61 poises, 69 poises, 56 poises, and 54 poises, respectively.

Subsequently, chocolate chips of approximately 0.05 g single-lump weight with horn-shaped tips were obtained by dripping the chocolate preparations of each of Embodiments 3–6 onto a steel belt by means of a depositor having a nozzle with a 5 mm diameter aperture.

Embodiment 7

| MILK CHOCOLATE CHIP PREPARATION | | |
|---|---|---|
| Chocolate Compound (in parts) | | |
| cocoa mass | 12.1 | parts |
| powdered whole milk | 18.7 | " |
| sugar | 36.6 | " |
| cocoa butter | 32.6 | " |
| vanillin | 0.03 | " |
| sugar ester (HLB16) | 0.5 | " |
| glycerol ester of fatty acid (IV.2) | 2.5 | " |
| Total Fatty Oil Content (%) | 44.1 | % |
| Breakdown of Fatty Oil Ingredients (%) | | |
| cocoa butter | 89.0 | % |
| milk fat | 11.0 | " |
| Viscosity at 45° C. | | 242 P (poises) |

Chocolate for forming in confectionary production was prepared using a raw material made from the above compounds, subjecting the preparation to roll-milling and conching treatments according to ordinary methods, whereupon the Casson plastic viscosity when measured at 45° C. was 242 poises.

Subsequently, chocolate chips of approximately 0.05 g single-lump weight with horn-shaped tips were obtained by dripping the chocolate preparation onto a steel belt by means of a depositor having a nozzle with a 5 mm diameter aperture.

Embodiment 8

| MILK CHOCOLATE CHIP PREPARATION | | |
|---|---|---|
| Chocolate Compound (in parts) | | |
| cocoa mass | 21.4 | parts |
| powdered whole milk | 7.9 | " |
| sugar | 36.3 | " |
| lactose | 7.5 | " |
| soft palm kernel oil (melt. pt. 20° C.) | 16.9 | " |
| soybean oil | 10.0 | " |
| vanillin | 0.03 | " |
| sugar ester (HLB16) | 0.5 | " |
| glycerol/polyglycerol ester of fatty acid (IV.2) | 1.5 | " |
| Total Fatty Oil Content (%) | 40.8 | % |
| Breakdown of Fatty Oil Ingredients (%) | | |
| cocoa butter | 28.9 | % |
| milk fat | 5.2 | " |
| soft palm oil | 41.4 | " |
| soybean oil | 24.5 | " |

Using each type of glycerol fatty acid esters/polyglycerol fatty acid esters given in the following table in turn as the emulsifier, in a raw material made from the compounds listed in the table above, chocolate preparations for forming into chocolate chips were produced.

The viscosities at 45° C. following conching of the respective preparations employing each of the emulsifiers is as below.

With whichever of the chocolate preparations thus produced it was possible smoothly to manufacture chocolate chips.

| Embodiment 8 Viscosities at 45° C. | | | |
|---|---|---|---|
| Emulsifier Type | Derivation of Linking Fatty Acid | Iodine Value | Viscosity (poises) |
| MG[1] | behenic acid | 4 | 54 P |
| " | hardened animal fatty oil | 2 | 82 " |
| " | hardened vegetable fatty oil | 3 | 72 " |

Embodiment 8 Viscosities at 45° C.

| Emulsifier Type | Derivation of Linking Fatty Acid | Iodine Value | Viscosity (poises) |
|---|---|---|---|
| " | hardened vegetable fatty oil | 3 | 61 |
| " | hardened rapeseed oil | 3 | 53 |
| " | hardened soybean oil | 3 | 88 |
| " | hardened soybean oil | 3 | 46 |
| " | hardened beef tallow | 2 | 62 |
| " | myristic acid | 2 | 48 |
| " | palmitic acid | 2 | 54 |
| PGE[2] | behenic acid | 4 | 62 |

[1]MG: gylcerol fatty ester
[2]PGE: polygylcerol fatty ester

The present invention, as described in the foregoing, enables the public presentation of formed chocolate of exceedingly favorable oral dissolvability. In particular, the present invention enables the manufacture of formed chocolate that, conditional upon the forming or molding equipment of a given manufacturing installation, must be of a certain viscosity, which chocolate is nonetheless of sufficiently high fatty-oil content to provide accordingly favorably oral dissolvability.

Use of chocolate preparations in accordance with the present invention, however, is not limited to particular manufacturing installations and forming equipment. Apart from their use in cold-belt deposition applications, preparations in the present invention may, for example, be extruded into dough bases or onto biscuits in manufacturing sandwich cookies, or the chocolate preparations may be squeezed from bags for forming writing and patterns in cake and pastry decorating.

Various details of the present invention may be changed without departing from its spirit nor its scope. Furthermore, the foregoing description of the embodiments according to the present invention are provided for illustration only, and not for the purpose of limiting the invention as defined by the appended claims and their equivalents.

What is claimed is:

1. A chocolate manufacturing method, comprising:

a first step of preparing a confectionary chocolate preparation, said first step including mixing into the composition about 35–60% by weight fatty oil and an emulsifier selected from the group consisting of glycerol fatty acid esters having an iodine value of about 10 or less and polyglycerol fatty acid esters having an iodine value of about 10 or less; and a second step of carrying out roll-milling and conching treatments on the chocolate; wherein Casson plastic viscosity at 45° C. of the chocolate material after the roll-milling and conching treatments is adjusted so as to be 40 to 600 poises.

2. A chocolate manufacturing method as set forth in claim 1, wherein said fatty oil is present in the composition in a 40–55% by weight proportion.

3. A chocolate manufacturing method as set forth in claim 2, wherein the iodine value of said glycerol fatty acid esters and polyglycerol fatty acid esters is about 5 or less.

4. A chocolate manufacturing method as set forth in claim 1, wherein the iodine value of said glycerol fatty acid esters and polyglycerol fatty acid esters is about 5 or less.

5. A method of manufacturing a chocolate preparation for forming in confectionary production, comprising:

a step of preparing a mixture with at least a chocolate-liquor derived base, a sweetener, at least one fatty oil in proportion such that the fatty oil part within the mixture is made 35% to 60% by weight, and an emulsifier of iodine number 10 or less selected from glycerol esters of fatty acids and poly-glycerol esters of fatty acids;

a step of passing the mixture through refining rolls; and a step of conching the mixture to produce a chocolate preparation; wherein the fatty oil and emulsifier are compositionally adjusted such that the chocolate preparation has a Casson plastic viscosity at 45° C. of 40 to 600 poises.

6. A method of manufacturing a chocolate preparation as set forth in claim 5, wherein the fatty oil proportion is adjusted such that the fatty oil part within the mixture is made 40% to 55% by weight.

7. A method of manufacturing a chocolate preparation as set forth in claim 5, wherein the iodine number of the emulsifier selected from glycerol esters of fatty acids and poly-glycerol esters of fatty acids is 5 or less.

8. A method of manufacturing a chocolate preparation as set forth in claim 5, wherein the mixture is prepared such that the emulsifier selected from glycerol esters of fatty acids and poly-glycerol esters of fatty acids constitutes 1% to 5% by weight in proportion to total weight of the chocolate preparation.

9. A chocolate preparation for forming in confectionary production, manufactured by the process set forth in claim 5.

* * * * *